(12) United States Patent
Kawaguchi et al.

(10) Patent No.: US 9,654,038 B2
(45) Date of Patent: May 16, 2017

(54) CONTROL DEVICE AND METHOD FOR CONTROLLING ELECTRIC MOTOR

(75) Inventors: Tadashi Kawaguchi, Hiratsuka (JP); Kazuki Takehara, Hiratsuka (JP); Jun Morinaga, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/814,790

(22) PCT Filed: Apr. 16, 2012

(86) PCT No.: PCT/JP2012/060260
§ 371 (c)(1),
(2), (4) Date: Feb. 7, 2013

(87) PCT Pub. No.: WO2012/157382
PCT Pub. Date: Nov. 22, 2012

(65) Prior Publication Data
US 2014/0084831 A1    Mar. 27, 2014

(30) Foreign Application Priority Data
May 18, 2011 (JP) ................. 2011-111390

(51) Int. Cl.
*H02K 17/32* (2006.01)
*H02P 7/06* (2006.01)
(Continued)

(52) U.S. Cl.
CPC ............... *H02P 7/06* (2013.01); *E02F 9/123* (2013.01); *E02F 9/2095* (2013.01);
(Continued)

(58) Field of Classification Search
CPC ........ H02K 17/32; H02K 23/68; H02K 27/30; H02P 7/00
(Continued)

(56) References Cited

U.S. PATENT DOCUMENTS 4,697,418 A * 10/1987 Okabe et al. ............... 60/434
4,887,012 A * 12/1989 Kiya et al. .................. 318/434
(Continued)

FOREIGN PATENT DOCUMENTS

DE    112004001742 T5    5/2007
JP    2001-011897 A    1/2001
(Continued)

OTHER PUBLICATIONS

International Search Report dated Jul. 17, 2012, issued for PCT/JP2012/060260.
(Continued)

*Primary Examiner* — Kawing Chan
(74) *Attorney, Agent, or Firm* — Locke Lord LLP

(57) ABSTRACT

A control device of an electric motor includes: an operating state setting unit configured to set an operating state; a maximum output acquiring unit configured to acquire maximum output of the electric motor that is preset according to the operating state set; a speed detecting unit configured to detect a speed of the electric motor; a torque limit value calculating unit configured to calculate a torque limit value based on the speed and the maximum output; and a torque limiting unit configured to limit torque of the electric motor by the torque limit value when accelerating the electric motor.

7 Claims, 7 Drawing Sheets

(51) Int. Cl.
*E02F 9/12* (2006.01)
*E02F 9/20* (2006.01)
*H02P 3/02* (2006.01)
*E02F 9/22* (2006.01)
*H02P 23/20* (2016.01)

(52) U.S. Cl.
CPC .......... *E02F 9/2292* (2013.01); *E02F 9/2296* (2013.01); *H02P 3/02* (2013.01); *H02P 23/20* (2016.02)

(58) Field of Classification Search
USPC ........................................................ 318/434
See application file for complete search history.

(56) References Cited

U.S. PATENT DOCUMENTS

| | | | |
|---|---|---|---|
| 6,211,636 B1* | 4/2001 | Matsubara et al. | 318/434 |
| 6,909,254 B2* | 6/2005 | Saari et al. | 318/432 |
| 8,000,862 B2* | 8/2011 | Morinaga et al. | 701/50 |
| 2005/0001567 A1 | 1/2005 | Yoshimatsu | |
| 2006/0279241 A1 | 12/2006 | Tsutsui et al. | |
| 2007/0277986 A1* | 12/2007 | Morinaga et al. | 172/438 |
| 2008/0072588 A1* | 3/2008 | Ariga et al. | 60/449 |
| 2008/0082240 A1 | 4/2008 | Kagoshima et al. | |
| 2009/0037072 A1* | 2/2009 | Lin et al. | 701/99 |

FOREIGN PATENT DOCUMENTS

| | | |
|---|---|---|
| JP | 2003-155760 A | 5/2003 |
| JP | 2008-088659 A | 4/2008 |
| JP | 2008-115640 A | 5/2008 |
| JP | 2009-068197 A | 4/2009 |
| JP | 2009-127295 A | 6/2009 |
| JP | 2010-106511 A | 5/2010 |

OTHER PUBLICATIONS

Office Action dated Jun. 3, 2015 issued for corresponding German Patent Application No. 11 2012 000 073.0.

\* cited by examiner

CONTROL DEVICE AND METHOD FOR CONTROLLING ELECTRIC MOTOR

FIELD

The present invention relates to a control device and a method for controlling an electric motor that can be used for a working machine including a construction machine such as an excavator, a bulldozer, a dump truck, and a wheel loader.

BACKGROUND

There has been a working machine in which an operator thereof can set, at his/her will, an operation mode such as a power mode (P mode) which places emphasis on working efficiency and an economy mode (E mode) which places emphasis on fuel economy. On the other hand, a hybrid working machine including an electric motor for actuating a swing body, a traveling body and the like of the working machine has a structure in which an electric drive system and a hydraulic drive system are loaded together, the electric drive system driving the electric motor by electric energy, and the hydraulic drive system driving a work implement, a traveling unit and the like by actuating a hydraulic cylinder and a hydraulic motor by using hydraulic fluid for a hydraulic pump directly connected to an engine. Thus, when no output limit corresponding to the operation mode is imposed on the electric motor in spite of the output limit imposed on the engine in accordance with the operation mode being set, the operator who operates the hybrid working machine may perceive the difference in operability thereof as compared with the operability of the working machine, which is loaded only with the hydraulic drive system, as operational incongruity. Moreover, when no output limit corresponding to the operation mode is imposed on the electric motor in spite of the output limit imposed on the engine in accordance with the operation mode being set, there would be discordance generated between operating speeds of the electric drive system and the hydraulic drive system, which would also be perceived as incongruity by the operator who operates the hybrid working machine.

In order to eliminate such operational incongruity, there exists a hybrid working machine in which a torque limit is imposed on the electric motor according to the operation mode being set. For example, the torque limit corresponding to the operation mode is imposed on a swing electric motor which swings an upper swing body of a hybrid excavator. FIG. 7 illustrates a torque line graph of swing torque that can be exerted with respect to a swing speed in the hybrid excavator. A curve LP1 is a maximum torque line representing the maximum torque that can be output by the swing electric motor when the P mode is set. A curve LE1 represents a maximum torque line when the E mode is set. Under such torque limit, the maximum torque being output at the swing speed equal to or less than a predetermined swing speed is smaller when the E mode is set than when the P mode is set.

CITATION LIST

Patent Literature

Patent Literature 1: Japanese Laid-open Patent Publication No. 2009-68197

SUMMARY

Technical Problem

However, the torque limit set for the E mode as illustrated in FIG. 7 would cause work efficiency to decrease since the maximum torque is limited low, which causes the swing power to decrease when the upper swing body swings at a low speed. Specifically, high swing power cannot be obtained when the upper swing body is to be swung from standstill to level off a mound with a side of a bucket of the work implement, thereby causing the work efficiency to decrease.

In order to solve such problem, as illustrated in FIG. 8, the torque limit can be imposed as represented by a curve LE2 in which, when the E mode is set, the torque limit is released at a selected swing speed in a low speed area so that the same torque can be obtained as when the P mode is set.

In this case, however, the output limit imposed on the swing electric motor would be the same for the P mode and the E mode at the swing speed other than the swing speed at which the P mode and the E mode have the different maximum torques. This would cause a difference in the acceleration performance between the electric drive system and the hydraulic drive system when the P mode or the E mode is set, thereby still possibly imparting the operational incongruity to the operator.

The present invention has been proposed in consideration of the aforementioned problems, and an object thereof is to provide the device and the method for controlling the electric motor that can reduce the operational incongruity including the acceleration performance in the working machine.

Solution to Problem

To achieve the object mentioned above, according to the present invention, a control device of an electric motor comprises: an operating state setting unit configured to set an operating state; a maximum output acquiring unit configured to acquire maximum output of the electric motor that is preset according to the operating state set; a speed detecting unit configured to detect a speed of the electric motor; a torque limit value calculating unit configured to calculate a torque limit value based on the speed and the maximum output; and a torque limiting unit configured to limit torque of the electric motor by the torque limit value when accelerating the electric motor.

According to the present invention, the torque limiting unit limits the torque of the electric motor by a torque limit value for deceleration when decelerating the electric motor, regardless of the operating state set.

According to the present invention, the torque limiting unit is capable of outputting the maximum torque at a predetermined speed or less, regardless of the operating state set.

According to the present invention, the operating state setting unit is an operation mode selection unit and/or a throttle dial.

According to the present invention, a method for controlling an electric motor comprises: setting an operating state; acquiring maximum output of the electric motor that is preset according to the operating state set; detecting a speed of the electric motor; calculating a torque limit value based on the speed and the maximum output; and limiting torque of the electric motor by the torque limit value when accelerating the electric motor.

According to the present invention, the limiting includes limiting the torque of the electric motor by a torque limit value for deceleration when decelerating the electric motor, regardless of the operating state set.

According to the present invention, the limiting includes being capable of outputting the maximum torque at a predetermined speed or less, regardless of the operating state set.

According to the present invention, the setting includes operation mode selection setting and/or throttle dial value setting.

The present invention is adapted to obtain the maximum output of the electric motor that is preset according to the operating state set and to calculate the torque limit value based on the speed of the electric motor and the maximum output obtained, whereby the operational incongruity including the acceleration performance can be reduced when operating the working machine.

DESCRIPTION OF EMBODIMENTS

Embodiments of the present invention will be described below with reference to the accompanying drawings.

(First Embodiment)
[Overall Structure]

Figure 1:
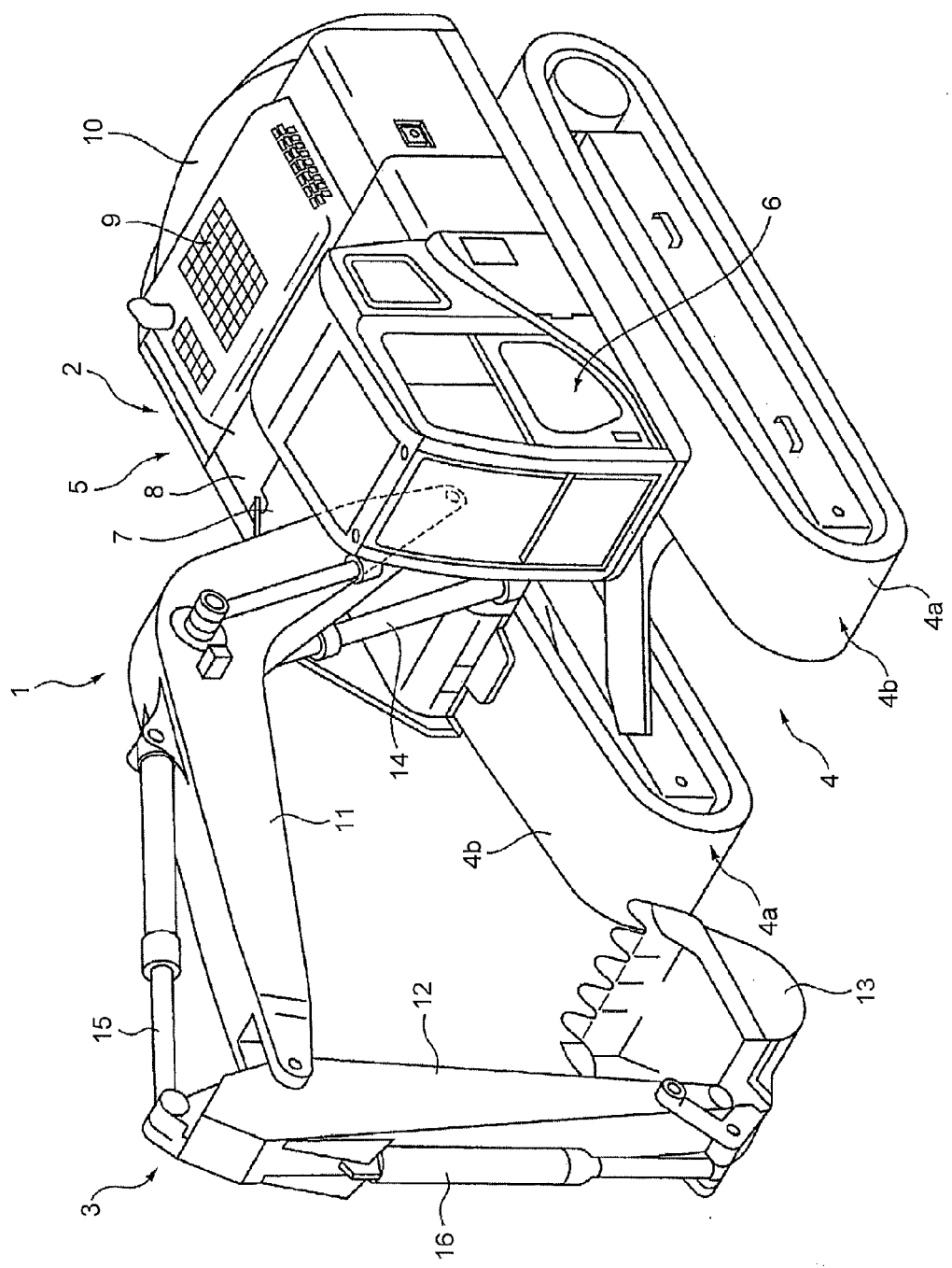
FIG. 1 is a perspective view illustrating an overall structure of a hybrid excavator according to a first embodiment of the present invention.
Figure 2:
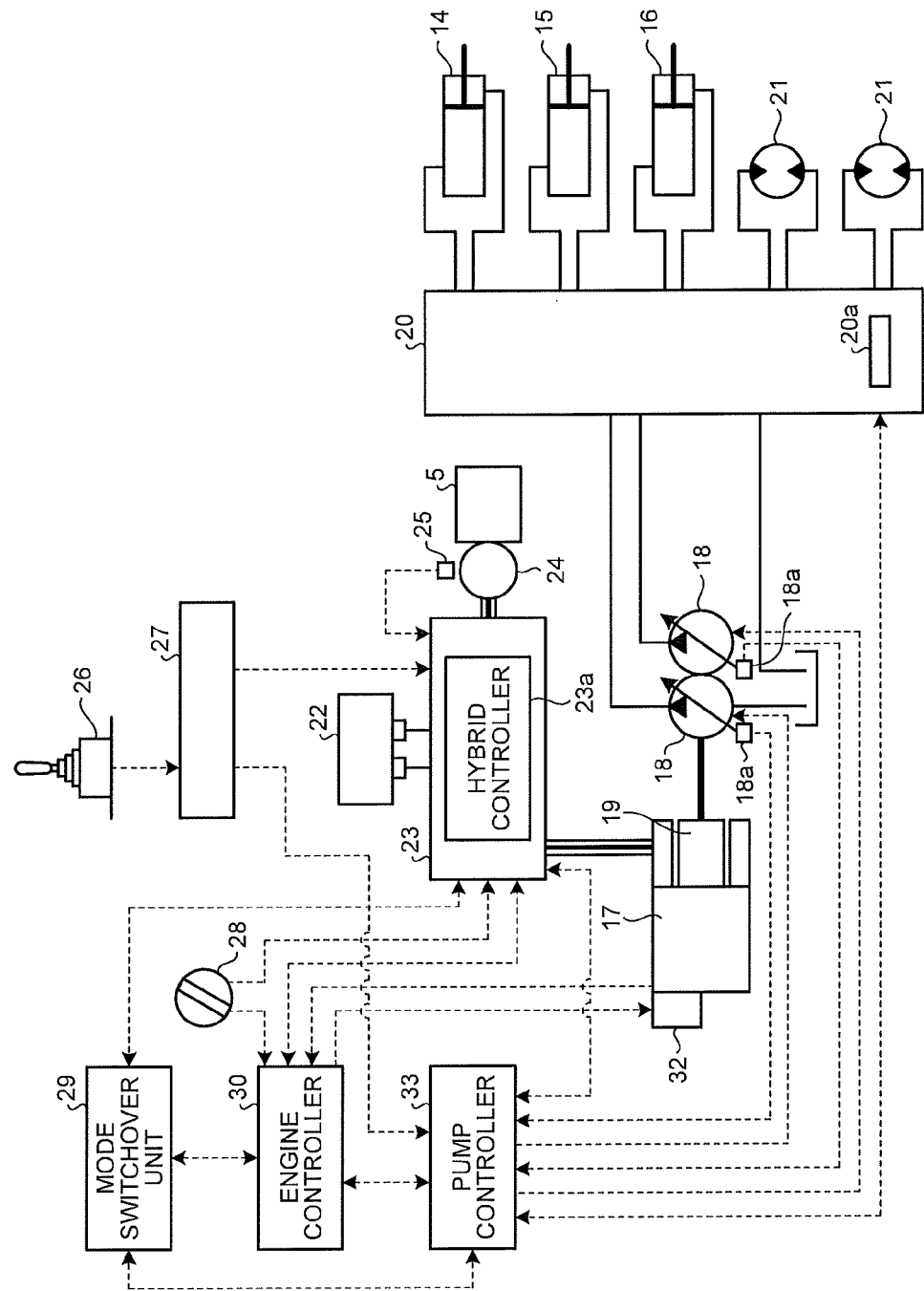
FIG. 2 is a schematic diagram illustrating the structure of a control system of the hybrid excavator illustrated in FIG. 1.

FIGS. 1 and 2 illustrate the overall structure of a hybrid excavator 1 as an example of a working machine. The hybrid excavator 1 includes a vehicle body 2 and a work implement 3. The vehicle body 2 includes a lower traveling body 4 and an upper swing body 5. The lower traveling body 4 includes a pair of traveling units 4a. Each traveling unit 4a includes a crawler belt 4b. Each traveling unit 4a drives the crawler belt 4b by a right travel motor and a left travel motor (a travel motor 21) to make the hybrid excavator 1 travel.

The upper swing body 5 is swingably mounted on the lower traveling body 4 and swings by the driving of a swing motor 24 (an electric motor). The upper swing body 5 is also provided with an operator's cab 6. The upper swing body 5 includes a fuel tank 7, a hydraulic fluid tank 8, an engine compartment 9, and a counter weight 10. The fuel tank 7 stores fuel for driving an engine 17. The hydraulic fluid tank 8 stores a hydraulic fluid discharged from a hydraulic pump 18 to a hydraulic cylinder such as a boom cylinder 14 or hydraulic equipment such as the travel motor 21. The engine compartment 9 houses parts such as the engine 17 and the hydraulic pump 18. The counter weight 10 is arranged posterior to the engine compartment 9.

The work implement 3 is mounted in the center of the anterior part of the upper swing body 5 and includes a boom 11, an arm 12, a bucket 13, the boom cylinder 14, an arm cylinder 15, and a bucket cylinder 16. The base end of the boom 11 is rotatably connected to the upper swing body 5, and the tip end of the boom 11 is rotatably connected to the base end of the arm 12. The tip end of the arm 12 is rotatably connected to the bucket 13. The boom cylinder 14, the arm cylinder 15, and the bucket cylinder 16 are the hydraulic cylinders adapted to move telescopically by the hydraulic fluid discharged from the hydraulic pump. The boom cylinder 14, the arm cylinder 15, and the bucket cylinder 16 are adapted to swing the boom 11, the arm 12, and the bucket 13, respectively.

In FIG. 2, the hybrid excavator 1 includes the engine 17 as a driving source, the hydraulic pump 18, and a generator 19. A diesel engine is used as the engine 17, and a variable displacement hydraulic pump (such as a swash plate hydraulic pump) is used as the hydraulic pump 18. The hydraulic pump 18 and the generator 19 are mechanically joined to an output shaft of the engine 17 so that the hydraulic pump 18 and the generator 19 would be driven by driving the engine 17. A hydraulic drive system includes a control valve 20, the boom cylinder 14, the arm cylinder 15, the bucket cylinder 16, the travel motor 21 and the like, which are driven by the hydraulic pump 18 as a hydraulic source.

An electric drive system includes a capacitor 22, an inverter 23, and a swing motor 24. The generator 19 and the capacitor 22 serve as a power source for the swing motor 24 to swing the upper swing body 5. That is, the swing motor 24 exerts motor action by the electric energy supplied from the generator 19 or the capacitor 22 to perform swing acceleration on the upper swing body 5, and exerts regenerative action when the upper swing body 5 experiences swing deceleration so that the electric energy is supplied (charged) to the capacitor 22. An SR (switched reluctance) motor is used as the generator 19, for example. The generator 19 is mechanically joined to the output shaft of the engine 17 so that a rotor shaft of the generator 19 is rotated by driving the engine 17. An electric double layer capacitor is used as the capacitor 22, for example. The capacitor 22 may be replaced with a nickel-hydrogen battery or a lithium-ion battery. The swing motor 24 is provided with a speed sensor 25 that detects a speed of the swing motor 24 and converts the speed into an electric signal to be output to a hybrid controller 23a provided in the inverter 23. An interior permanent magnet synchronous motor is used as the swing motor 24, for example. A resolver, a rotary encoder or the like is used as the speed sensor 25. Here, the hybrid controller 23a includes a CPU (a calculation unit such as a numeric data processor), a memory (a storage unit), and the like. The hybrid controller 23a manages excessive temperature rise in each unit such as the capacitor 22 by receiving a signal of a detection value detected by a temperature sensor such as a thermistor and a thermocouple included in the generator 19, the swing motor 24, the capacitor 22 and the inverter 23. Moreover, the hybrid controller 23a performs charge/discharge control on the capacitor 22, assist control of power generated by the generator 19 and the engine, and powering/regenerating control on the swing motor 24.

The hydraulic drive system and the electric drive system are driven in response to the operation of a control lever 26 such as a work implement lever, a travel lever, and a swing lever that are provided in the operator's cab 6 of the vehicle body 2. The control input of the control lever 26 is converted into an electric signal by a lever control input detection unit 27. The lever control input detection unit 27 includes a pressure sensor. A pilot hydraulic pressure generated according to the operation of the control lever is detected by the pressure sensor, and voltage or the like output therefrom is converted to obtain the lever control input. When the control lever 26 is an electric lever, the lever control input detection unit 27 includes electric detection means such as a potentiometer, where the lever control input is obtained by converting the voltage or the like generated according to the lever control input.

Provided in the operator's cab 6 are a fuel regulation dial (a throttle dial) 28 and a mode switchover unit 29. The fuel regulation dial (the throttle dial) 28 is a switch for setting the amount of fuel supplied to the engine 17, and a set value of the fuel regulation dial (the throttle dial) 28 is converted into the electric signal to be output to an engine controller 30.

The engine controller 30 includes a calculation unit such as a CPU (a numeric data processor), and a memory (a storage unit). The engine controller 30 creates a signal for a control command based on the set value of the fuel regulation dial (the throttle dial) 28, and a common rail control unit 32 receives a control signal and regulates the amount of fuel injected to the engine 17. That is, the engine 17 is an engine that can be subjected to common rail electronic control, by which a target output can be achieved by appropriately controlling the fuel injection amount, and the torque that can be output by an engine speed at a given instant can be set freely.

The mode switchover unit 29 sets an operation mode of the hybrid excavator 1 to a power mode (P mode) or an economy mode (E mode) and includes, for example, an operation button or switch, or a touch panel provided in the operator's cab 6. The operator of the hybrid excavator 1 operates the operation button or the like to switch the operation mode. The power mode is the operation mode for performing engine control and pump control in which the fuel economy is held down while maintaining a heavy workload. On the other hand, the economy mode is the operation mode for performing the engine control and the pump control such that an operating speed of the work implement 3 is secured in light-load work while further holding down the fuel economy. Once the operation mode is set by the mode switchover unit 29 (switchover of the operation mode), an electric signal corresponding to the setting is output to the engine controller 30, a pump controller 33, and the hybrid controller 23a. Note that in the power mode, the output torque of the engine 17 is matched with the absorption torque of the hydraulic pump 18 in a region where the engine output (the speed and the output torque) of the engine 17 is relatively high. In the economy mode, this matching occurs when the engine output is lower than the case in the power mode.

The pump controller 33 receives the signal output from the engine controller 30, the mode switchover unit 29, and the lever control input detection unit 27, and generates the signal for the control command to regulate the amount of the hydraulic fluid ejected from the hydraulic pump 18 by performing tilting control on a swash plate angle of the hydraulic pump 18. Here, a signal from a swash plate angle sensor 18a that detects the swash plate angle of the hydraulic pump 18 is input into the pump controller 33. The pump capacity of the hydraulic pump 18 can be calculated by detecting the swash plate angle thereof by the swash plate angle sensor 18a. Provided in the control valve 20 is a pump pressure detection unit 20a that detects the pump ejection pressure of the hydraulic pump 18. The detected pump ejection pressure is converted into the electric signal and input into the pump controller 33. Note that the engine controller 30, the pump controller 33, and the hybrid controller 23a are connected via an in-vehicle LAN such as a CAN (Controller Area Network) in order to exchange information with one another.

[Overview of Torque Limit]

Figure 3:
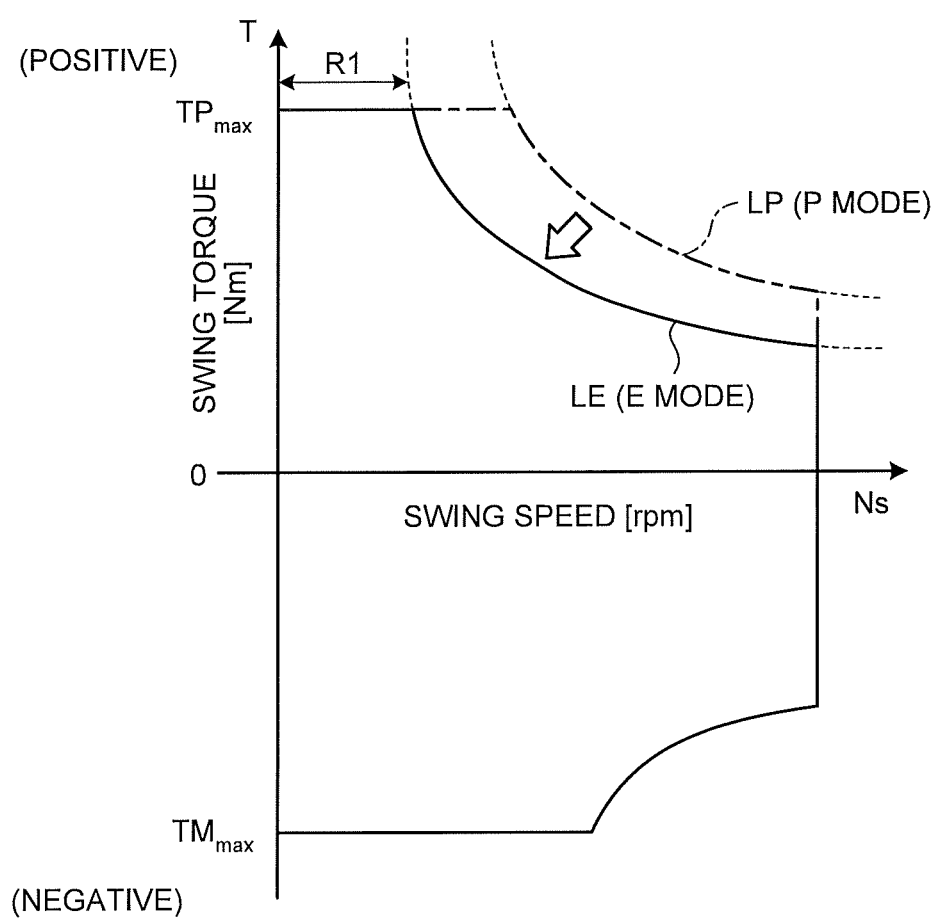
FIG. 3 is a torque line graph illustrating the overview of torque limit imposed on a swing motor by a controller.

An overview of torque limit on the swing motor 24 will now be described. FIG. 3 illustrates the overview of the torque limit according to a first embodiment, the torque limit being imposed on the swing motor 24 by the engine controller 30. It is a torque line graph illustrating limit characteristics of the swing torque with respect to the swing speed. In FIG. 3, the swing torque generated when powering (accelerating) is indicated by a positive, and the swing torque generated when regenerating (decelerating) is indicated by a negative. When the P mode is set by the mode switchover unit 29, the torque limit is imposed in accordance with a torque limit curve LP illustrating the maximum torque that can be output by the swing motor 24. When the E mode is set by the mode switchover unit 29, on the other hand, the torque limit at the time of powering (accelerating) is imposed in accordance with a torque limit curve LE by which the maximum swing output that is preset to the E mode is limited. That is, when the operation mode is set, the torque limit is imposed in accordance with an equivalent horsepower curve corresponding to the maximum swing output for the operation mode being set. Therefore, a decrease in the maximum swing output for the operation mode is represented by the equivalent horsepower curve of the swing motor 24 that is a torque limit curve formed by shifting the entire curve to the lower left, as illustrated in FIG. 3. As a result, the swing operation with acceleration performance corresponding to the hydraulic drive system can be performed, thereby eliminating the operational incongruity.

The torque limit is imposed in accordance with the torque limit curve (LP or LE) corresponding to the equivalent horsepower curve. Now, in a region R1 where the swing speed of the swing motor 24 is low, the maximum torque TPmax is output so that no obstacle such as a sense of insufficient power would be in the way of performing the swing operation. When the E mode is set, the amount of torque that can be output is decreased in a region where the swing speed is high. However, in the region where the swing speed is high, the output necessary for the swing operation can be obtained sufficiently since the swing speed is high even when the torque is low. Moreover, when either operation mode is set, there is one torque limit curve for regenerating (decelerating) as illustrated in FIG. 3, with no difference in the torque limit. As a result, the stopping performance of the swing motor 24 can be sufficiently delivered.

[Detail of Torque Limit]

Figure 4:
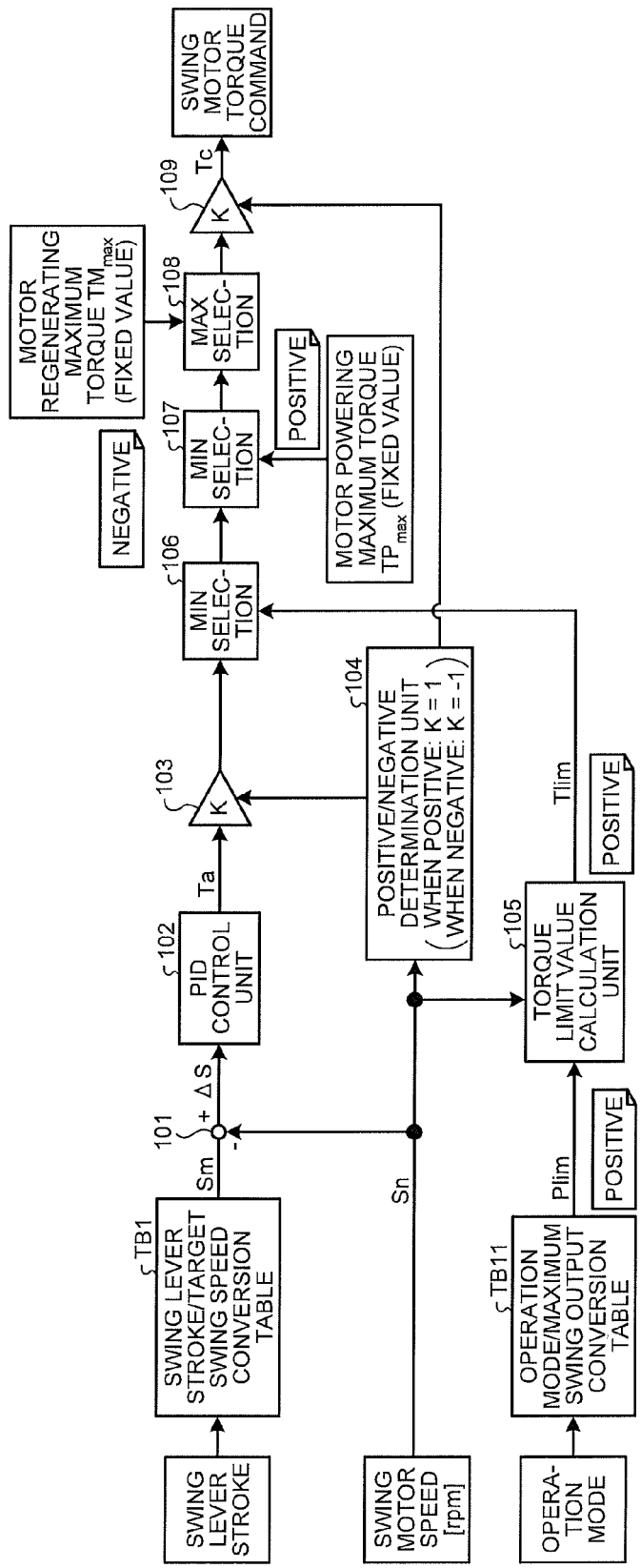
FIG. 4 is a diagram illustrating a control flow of the torque limit imposed on the swing motor by the controller.

Next, specific torque limit control imposed on the swing motor 24 will be described with reference to FIG. 4. As illustrated in FIG. 4, input into the engine controller 30 directly or via the hybrid controller 23a are: a swing lever stroke (control input of the control lever 26) by the control lever 26; a swing motor speed of the swing motor 24 detected by the speed sensor 25; and the electric signal indicating the operation mode set by the mode switchover unit 29.

The swing lever stroke is input into a swing lever stroke/target swing speed conversion table TB1. The swing lever stroke/target swing speed conversion table TB1 outputs to a computing unit 101 a target swing speed Sm corresponding to the input swing lever stroke based on a preset relationship between the swing lever stroke and the target swing speed. The computing unit 101 subtracts a current swing motor speed Sn detected by the speed sensor 25 from the target swing speed Sm and inputs the subtracted speed deviation ΔS to a PID control unit 102. The PID control unit 102 calculates torque Ta from the speed deviation ΔS. This torque Ta is then multiplied by a gain K by a computing unit 103 to be output to a minimum value selection unit (MIN selection) 106. Here, the gain K is set to 1 when the swing motor speed Sn is determined to be positive by a positive/negative determination unit 104, and set to −1 when it is determined to be negative.

On the other hand, the signal indicating the operation mode set by the mode switchover unit 29 is input into an operation mode/maximum swing output conversion table TB11. The operation mode/maximum swing output conversion table TB11 outputs a maximum swing output Plim preset for each operation mode to a torque limit value calculation unit 105. The torque limit value calculation unit 105 calculates, based on the absolute values of the input maximum swing output Plim and the swing motor speed Sn, a torque limit value Tlim by the following formula.

$$Tlim=(Plim\times 1000)/((2\pi/60)\times Sn)$$

The calculated torque limit value Tlim is input to the minimum value selection unit 106.

The minimum value selection unit 106 selects the smaller of the torque (the target swing torque) input from the computing unit 103 and the torque limit value Tlim input from the torque limit value calculation unit 105, and outputs it to a minimum value selection unit (MIN selection) 107. The minimum value selection unit 107 outputs the smaller of the torque input from the minimum value selection unit 106 and a motor powering maximum torque TPmax that is a preset fixed value to a maximum value selection unit (MAX selection) 108. The minimum value selection unit 107 operates so as to output the torque that does not have a greater value on the positive side than the motor powering maximum torque TPmax at the time of powering, especially in the region R1 where the swing speed is low.

The maximum value selection unit 108 selects and outputs the greater of the torque input from the minimum value selection unit 107 and a motor regenerating maximum torque TMmax (a negative value) that is a preset fixed value. The maximum value selection unit 108 selects, at the time of powering, the torque input from the minimum value selection unit 107 as the maximum value because the motor regenerating maximum torque TMmax is a negative value. At the time of regenerating when the negative torque is output from the computing unit 103, however, the maximum value selection unit 108 outputs the torque that does not have a smaller value on the negative side than the motor regenerating maximum torque TMmax. That is to say, a swing motor torque command Tc is output within a limit range of the motor regenerating maximum torque TMmax (the lower limit of the swing torque) according to the swing lever stroke. Moreover, when either operation mode is set, the torque limit value Tlim calculated by the torque limit value calculation unit 105 at the time of regenerating is a positive value, whereas the torque Ta output from the PID control unit 102 to the computing unit 103, which is provided with the gain K as −1 from the positive/negative determination unit 104, is a negative value. As a result, the negative torque Ta is selected by the minimum value selection unit 106. Thus, at the time of regenerating (decelerating), the swing motor command value Tc is calculated and output regardless of the operation mode. A computing unit 109 then multiplies the torque output from the maximum value selection unit 108 by the gain K corresponding to the sign of the swing motor speed Sn, and outputs the multiplied torque Tc as the swing motor torque command to the hybrid controller 23a. By the aforementioned method, the torque limit can be performed as represented by the torque line graph in FIG. 3.

Note that the aforementioned process of obtaining the swing motor torque command may be performed by the hybrid controller 23a in place of the engine controller 30, or by a controller in which the engine controller 30 and the hybrid controller 23a are integrated.

(Second Embodiment)

In the aforementioned first embodiment, the torque limit value Tlim is calculated by using the maximum swing output Plim obtained according to the operation mode. In a second embodiment, a torque limit value Tlim is calculated by using a maximum swing output Plim that is obtained by a set value of a throttle dial (a fuel regulation dial 28) instead of an operation mode. This is because, in a hybrid excavator 1, the throttle dial can also perform engine output control and set the operating state.

Figure 5:
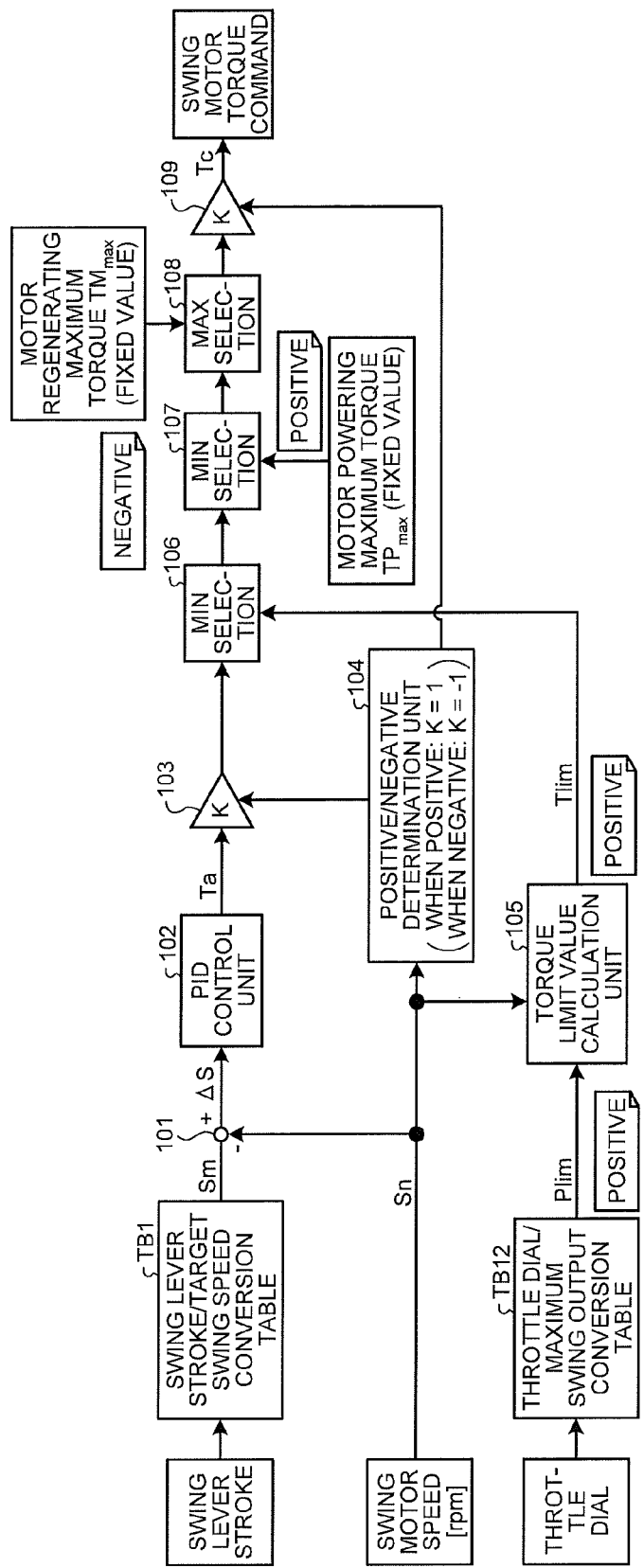
FIG. 5 is a diagram illustrating a control flow of torque limit imposed on an electric motor by a controller according to a second embodiment of the present invention.

FIG. 5 illustrates a torque limit control flow according to the second embodiment. In this torque limit control flow, a signal corresponding to the set value of the throttle dial (the fuel regulation dial 28) is used in place of the signal corresponding to the operation mode in FIG. 4, and a throttle dial/maximum swing output conversion table TB12 is used in place of the operation mode/maximum swing output conversion table TB11. The rest of the structure is the same as that in FIG. 5.

(Third Embodiment)

Figure 6:
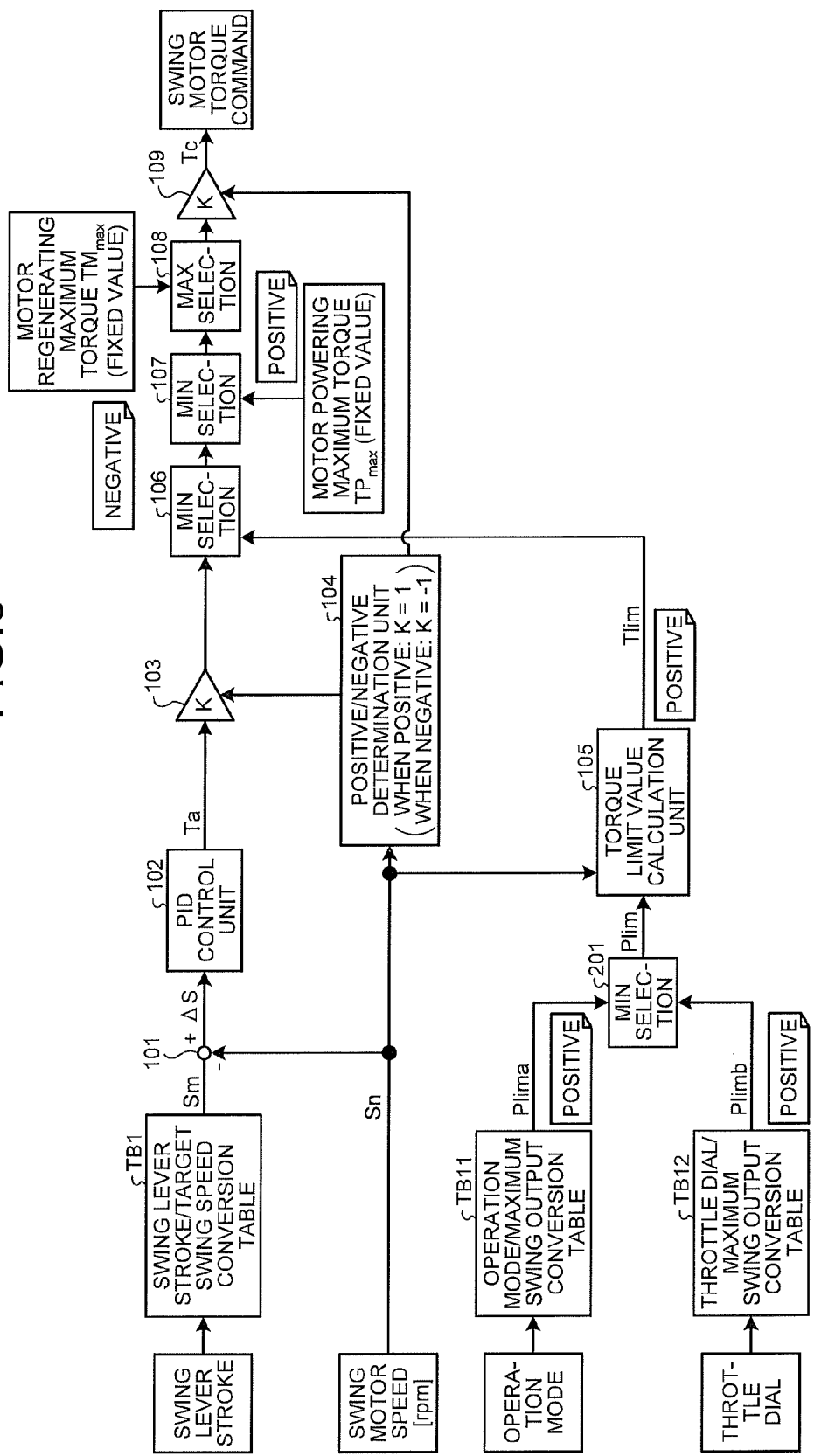
FIG. 6 is a diagram illustrating a control flow of torque limit imposed on an electric motor by a controller according to a third embodiment of the present invention.
Figure 7:
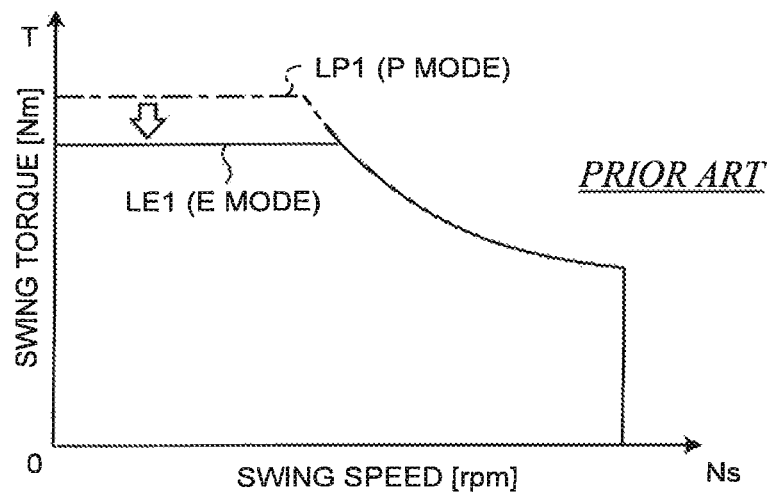
FIG. 7 is a torque line graph illustrating an example of torque limit imposed on a conventional electric motor.
Figure 8:
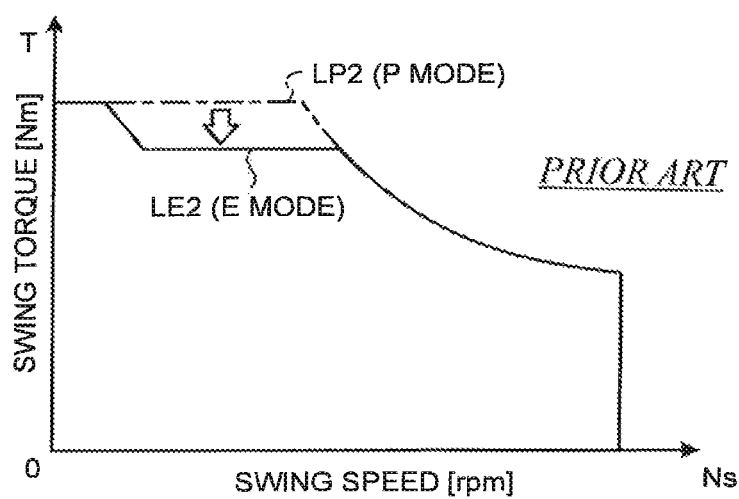
FIG. 8 is a torque line graph illustrating another example of the torque limit imposed on the conventional electric motor.

FIG. 6 illustrates a torque limit control flow according to a third embodiment. In the third embodiment, the torque limit control is performed by the combination of the first and second embodiments. That is, a signal corresponding to an operation mode as well as a signal corresponding to a set value of a throttle dial (a fuel regulation dial 28) are to be input, each signal being input into an operation mode/maximum swing output conversion table TB11 and a throttle dial/maximum swing output conversion table TB12, respectively, and each table converting the signals and outputting maximum swing outputs Plima and Plimb, respectively. A minimum value selection unit (MIN selection) 201 then inputs the maximum swing output Plim that is the smallest of the maximum swing outputs Plima and Plimb to a torque limit value calculation unit 105. The rest of the structure is the same as those in FIGS. 4 and 5.

(Fourth Embodiment)

In a fourth embodiment, a signal corresponding to an operation pattern is input in place of the signal corresponding to the operation mode in the first embodiment. The signal corresponding to the operation pattern is an operation pattern that is determined by a determination process of the operation pattern among a plurality of operation patterns and is input as a signal indicating the operation pattern. Once being input, the signal indicating the operation pattern is converted to a maximum swing output Plim preset for every operation pattern by an operation pattern/maximum swing output conversion table and is output.

The determination process of the operation pattern determines that it is the operation pattern of a heavy excavation when, for example, an arm lever for moving an arm 12 among work implement levers 26 is operated in the excavating direction, and when a pump ejection pressure of a hydraulic pump 18 is higher than a certain set value. In addition, the determination process determines that it is the operation pattern of a hoist swing when, for example, a swing lever 26 is operated and a boom lever for moving a boom 11 among the work implement levers 26 is operated in a direction of raising or lowering the boom 11. As described, the determination process of the operation pattern is to estimate the operation being attempted by an operator at that moment by a specific input value. Note that the hoist swing is the operation where earth and sand excavated by a bucket 13 is released at a desired position at which an upper swing body 5 stops swinging while raising the boom 11.

More detailed torque limit control can be performed by adopting such determination process of the operation pattern.

(Fifth Embodiment)

In a fifth embodiment, a hydraulic fluid temperature may be used as the input, and a hydraulic fluid temperature/maximum swing output conversion table may correct and convert a maximum swing output Plim that is output from each table according to the hydraulic fluid temperature. The hydraulic fluid temperature would be low and the viscosity of the hydraulic fluid would be increased when under the environment of low outdoor air temperature, when starting up a hybrid excavator 1, or the like. Although the increase in the viscosity of the hydraulic fluid would incur a decrease in the operating speed of a work implement, a swing motor 24 that is electrically driven would operate regardless of the temperature of the hydraulic fluid. An operator would thus feel a sense of incongruity when the temperature of the hydraulic fluid is not considered in operating an upper swing body 5 by the swing motor 24. Therefore, a swing operation can be performed in harmony with the operating speed of a work implement 3 by correcting and converting the value of the maximum swing output Plim according to the hydraulic fluid temperature, as described in this fifth embodiment. Note that, unlike the hybrid excavator, a normal hybrid excavator which swings by a hydraulic motor would experience a decrease in the maximum swing output with a decrease in the hydraulic fluid temperature. The operator would therefore feel no sense of incongruity when the control is performed by incorporating information on the hydraulic fluid temperature as described in the present embodiment. Here, the hybrid excavator 1 includes a sensor for detecting the hydraulic fluid temperature of a hydraulic pump 18, and an engine controller 30, a pump controller 33, or a hybrid controller 23a monitors the hydraulic fluid temperature.

By performing torque limit control in consideration of the operating state of the hydraulic drive system, there would be a better output balance and a torque balance between the operation of the electric drive system by the swing motor 24 and the operation of the hydraulic drive system, thereby reducing the operational incongruity.

REFERENCE SIGNS LIST 1 hybrid excavator
2 vehicle body
3 work implement
4 lower traveling body
5 upper swing body
11 boom
12 arm
13 bucket
14 boom cylinder
15 arm cylinder
16 bucket cylinder
17 engine
18 hydraulic pump
18a swash plate angle sensor
19 generator
20 control valve
20a pump pressure detection unit
21 travel motor
22 capacitor
23 inverter
23a hybrid controller
24 swing motor
25 speed sensor
26 control lever
27 lever control input detection unit
28 fuel regulation dial
29 mode switchover unit
30 engine controller
32 common rail control unit
33 pump controller
105 torque limit value calculation unit

The invention claimed is:

1. A control device of a swing electric motor of an excavator comprising:
a lowering travelling body;
an upper swing body;
an engine provided in the upper swing body;
a generator configured to be driven by driving the engine;
a hydraulic pump configured to be driven by driving the engine;
the swing electric motor configured to swing the upper swing body by electric energy supplied from the generator;
an operating state setting unit configured to set an operating state based on an operating mode setting, a throttle dial value setting or a hydraulic fluid temperature;
a maximum output acquiring unit configured to acquire a maximum swing torque output of the swing electric motor that is preset according to the operating state set;
a speed detecting unit configured to detect a speed of the swing electric motor;
a torque limit value calculating unit configured to calculate a torque limit value based on the speed and the maximum swing torque output; and
a torque limiting unit configured to limit swing torque of the swing electric motor by the torque limit value when accelerating the swing electric motor,
wherein
when accelerating the swing electric motor, in a region where the speed of the swing electric motor is equal to or less than a predetermined speed, the maximum output acquiring unit acquires an identical, constant maximum swing torque output during acceleration regardless of the operating state set by the operating state setting unit,
when accelerating the swing electric motor, in a region where the speed of the swing electric motor is higher than the predetermined speed, the maximum output acquiring unit acquires one of different maximum swing torque outputs of the swing electric motor that are preset according to the operating state set.

2. The control device of the electric motor according to claim 1, wherein the operating state setting unit is an operation mode selection unit and/or a throttle dial.

3. The control device of the electric motor according to claim 1, wherein the torque limiting unit limits the torque of the electric motor by a torque limit value for deceleration when decelerating the electric motor, regardless of the operating state set.

4. A method for controlling a swing electric motor of an excavator having a lowering travelling body; an upper swing body; an engine provided in the upper swing body; a generator configured to be driven by driving the engine; a hydraulic pump configured to be driven by driving the engine; and the swing electric motor being configured to swing the upper swing body by electric energy supplied from the generator, the method comprising:

setting an operating state based on an operating mode setting, a throttle dial value setting or a hydraulic fluid temperature;

acquiring a maximum swing torque output of the swing electric motor that is preset according to the operating state set;

detecting a speed of the swing electric motor;

calculating a torque limit value based on the speed and the maximum swing torque output; and limiting swing torque of the swing electric motor by the torque limit value when accelerating the swing electric motor, wherein when accelerating the swing electric motor, in a region where the speed of the swing electric motor is equal to or less than a predetermined speed, the maximum output acquiring unit acquires an identical, constant maximum swing torque output during acceleration regardless of the operating state set by the operating state setting unit, when accelerating the swing electric motor, in a region where the speed of the swing electric motor is higher than the predetermined speed, the maximum output acquiring unit acquires one of different maximum swing torque outputs of the swing electric motor that are preset according to the operating state set.

5. The method for controlling the electric motor according to claim 4, wherein the setting includes operation mode selection setting and/or throttle dial value setting.

6. The method for controlling the electric motor according to claim 4, wherein the limiting includes the torque of the electric motor by a torque limit value for deceleration when decelerating the electric motor, regardless of the operating state set.

7. A control device of a swing electric motor of an excavator comprising:

an operating state setting unit configured to set an operating state selected from a power mode and an economy mode;

a maximum output acquiring unit configured to acquire maximum swing torque output of the swing electric motor that is preset according to the operating state;

a speed detecting unit configured to detect a speed of the swing electric motor;

a torque limit value calculating unit configured to calculate a torque limit value based on the speed and the maximum output; and a torque limiting unit configured to limit torque of the swing electric motor by the torque limit value when accelerating the swing electric motor, wherein when the power mode is set, the swing electric motor has a power mode torque limit curve that determines a swing torque output of the swing electric motor, when the economy mode is set, the swing electric motor has an economy mode torque limit curve that determines the output of the swing electric motor so that at low speed during acceleration, the output is the same as the power mode torque limit curve but at high speed during acceleration, the output is decreased, during deceleration, in either the power or economy mode, both of the power mode torque limit and the economy mode torque limit have the same torque limit, when accelerating the swing electric motor, in a region where the speed of the swing electric motor is equal to or less than a predetermined speed, the maximum output acquiring unit acquires an identical, constant maximum swing torque output during acceleration regardless of the operating state set by the operating state setting unit, and when accelerating the swing electric motor, in a region where the speed of the swing electric motor is higher than the predetermined speed, the maximum output acquiring unit acquires one of different maximum swing torque output of the swing electric motor that are preset according to the operating state set.

* * * * *